Feb. 17, 1959 G. HAINKE 2,873,556
PROCESS OF MAKING ARMORED GLASS
Filed June 17, 1954

INVENTOR.
GEORG HAINKE
BY
Bauer and Seymour
ATTORNEYS

United States Patent Office 2,873,556
Patented Feb. 17, 1959

2,873,556

PROCESS OF MAKING ARMORED GLASS

Georg Hainke, Stolberg, Germany, assignor to Societe Anonyme des Manufactures des Glaces et Produits Chimiques de Saint-Gobain Chauny & Cirey, Paris, France Application June 17, 1954, Serial No. 437,429

Claims priority, application France June 22, 1953

8 Claims. (Cl. 49—86)

This invention relates to a method of making armored glass. Armored glass is glass which is reinforced, usually by metal. The commoner forms of armored glass consist of glass sheets which enclose a metal wire screen, but there are many forms of armored glass differing from each other in the type of glass employed or in the nature of the reinforcement, either its material or its arrangement. This invention is applicable to all forms of armored glass. The invention is in the process by which the glass is made. The invention will be described as an improvement in a standard method of making armored glass wherein glass is rolled as a continuous sheet from a furnace and while it is still hot and soft a wire screen is enclosed in it, but the invention is applicable not only to this particular illustration but to all processes of making armored glass.

The manufacture of armored glass has been characterized by certain difficulties such as the occurrence of bubbles, a clarity less than that of the same glass without the armor, some dimness and opacity, particularly in the regions adjacent the armor, for instance, in the immediate neighborhood of the wires of a wire screen, and an appearance of tarnish on the metal of the armor. In the neighborhood of the wires, for example, it is frequently found that the glass is discolored although not so discolored in the regions remote from the wires.

It is an object of this invention to improve the clarity and color of armored glass, to eliminate or materially reduce tarnish on the metal, to reduce the formation of bubbles, to eliminate discoloration near the armor, and to improve the clarity of armored glass.

The objects of the invention are accomplished generally speaking by joining the glass and the armor within a medium consisting of a non-oxidizing atmosphere. The theory of the invention is that the armor, which is raised to the high temperature of the glass as it enters the glass, becomes oxidized on its surface by contact with the air, which accounts for the tarnish which is visible on the wires, and that the film of oxide thus produced is absorbed into the hot soft glass and discolors it in the neighborhood of the metal. By maintaining the armor in a non-oxidizing atmosphere, which may be either inert or reducing, as it approaches the glass to be incorporated therein, the noted objections are overcome and a new armored glass is provided which is superior to that of the prior art in sparkle, in transparency, in uniformity of transparency, in color, and in uniformity of color. Furthermore, the wire itself retains its brightness after incorporation.

The discoveries of this invention have led to other improvements. It has been found possible to preheat the armor to a temperature equal to that of the glass to which it is to be admitted, or even to heat it to a higher temperature which materially facilitates the penetration of the glass into the interstices and joints of the wire, provided the preheating of the armor be carried out in a non-oxidizing atmosphere and provided that the non-oxidizing atmosphere is maintained about the armor after it has been preheated.

The applicant has observed in the course of the manufacture of armored glass, particularly when the glass is being made from glass, in a plastic state, and a screen of mild steel, that at the relatively high temperature to which the screen is raised at the moment of its introduction into the glass, by reason of its proximity to the hot glass, an oxidation is produced on the steel by its contact with atmospheric air. A couch of oxide forms and has the effect, in the first place, of tarnishing the wire and, in the second place, of dissolving in the glass, reducing its brilliance, coloring it, particularly in the neighborhood of the wire and, to the extent that the tarnish remains on the wire and is not dissolved, detracting from the brightness of the glass and the wire. All of these factors detract from the transparency, which has not previously been quite satisfactory in armored glass.

It might be thought that it would be advantageous to maintain the temperature of the armor at a low degree until it has been introduced into the glass in order to avoid its oxidation, but that is not advantageous because the introduction of cold wire into the hot glass tends to retain air in the armor and to introduce bubbles or voids about the armor in the glass. As these bubbles are carried in and expand when heated by the glass, the use of cold wire is not to be recommended. On the contrary, it is my discovery that it is advantageous to preheat the armor before its introduction into the glass to a temperature equal to or even higher than that which it naturally attains by reason of its proximity to the molten glass.

The invention is carried out in a practical way by establishing around the armor in the region of its introduction into the hot glass an atmosphere which protects the armor against oxidation, preferably without lowering its temperature prior to its introduction into the glass. By this means the formation of bubbles or voids in the glass is obviated. A particular inert or reducing atmosphere established around the armor can be preheated and thus employed to increase the temperature of the armor, thus still further increasing the possibility of eliminating bubbles and voids.

All inert gases are useful, for instance, argon, helium, and nitrogen. Nitrogen is cheap and available and is wholly satisfactory. Furthermore, this gas may be used in a mixture with a reducing gas such as hydrogen, or illuminating gas, or gasogene gas. When so employed, it is advantageous to burn the additive gas partially or wholly in order to profit from the combustion of the gas to produce an atmosphere of reducing character and to increase the temperature of the armor. However, in burning the gas, care should be taken to prevent the attachment of small particles of carbon to the armor and its incorporation in the glass. Gas of reducing character can be used alone, for instance hydrogen and carbon oxide.

Hydrogen is available on the market and is a satisfactory reducing gas. The gases may be preheated without burning them, by the use of any satisfactory heat exchanger and the application therethrough of heat to the gas, the gas, at elevated temperature, being then used to expel atmospheric air from the armor just before it is admitted to the glass and to heat the armor to a temperature approximating that of the glass or even higher.

The entire operation of making the armored glass can be carried out in a chamber filled with inert gas, but such procedures are not necessary and it is preferred to proceed in the manner set forth in the specific examples hereinafter given.

Figure 1:
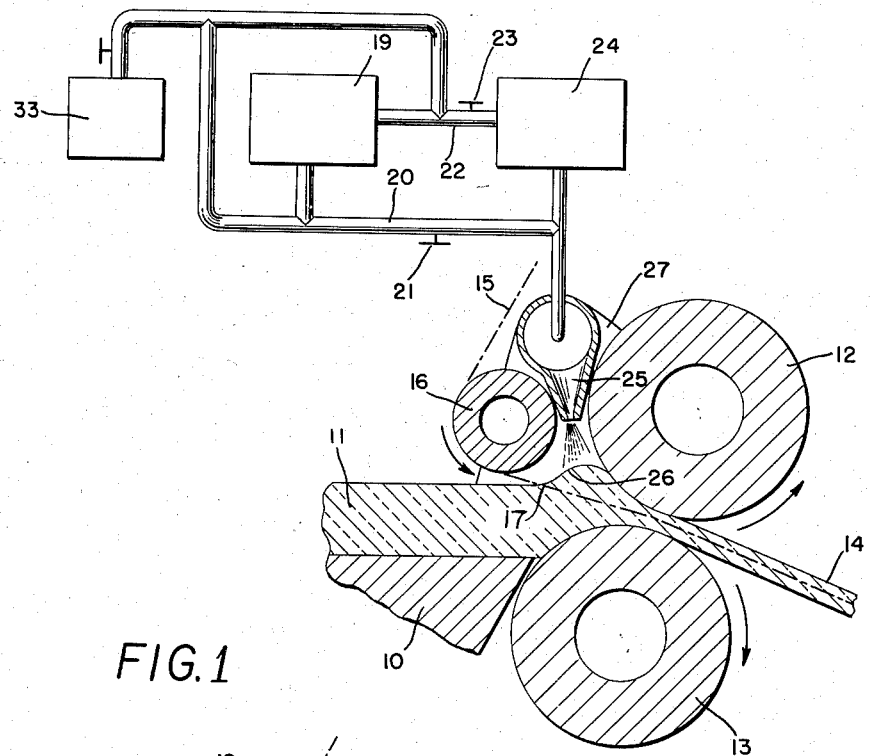
Fig. 1 is a diagrammatic view in vertical section through novel apparatus for making armored glass.

In the diagrammatic illustration of Fig. 1, the numeral 10 indicates the discharge lip of a glass furnace from which the sheet of glass 11 is being delivered to the forming rollers 12 and 13, which are rotated in the direction of the arrows, receive the sheet of glass 11 as it is delivered by the furnace, and compress it to the size desired in the final article, as indicated by the numeral 14. We may assume, for purposes of example, that the sheet of glass 14 as delivered by the rollers 12, 13 is six feet wide and one-quarter inch thick. A wire screen 15 of any type customarily employed in the manufacture of armored glass, for instance, made of a wire mesh screen having foraminations about 3/8" in diameter and having a width equal to that of the glass sheet 14 as it issues from the rollers 12, 13, comes from a source not shown and passes around the roller 16 which is driven in the direction of the arrow at a peripheral speed equal to the peripheral speed of rollers 12, 13. Thus, the speed of the wire 15 as it enters the glass is equal to the speed of the glass sheet 14 as it leaves rollers 12, 13. Thus far, the apparatus may be deemed to differ in no material way from apparatus which is known to the prior art. The wire screen 15 leaves the roller 16 and is gradually heated by its proximity to the soft glass 11, which is still at a very high temperature and, as the temperature of the screen becomes higher and higher, the more closely it approaches the point 17 at which it enters the glass, the rate of oxidation becomes higher and higher and a very considerable degree of oxide tarnish accumulates on the surface of the wire before its entry into the glass.

According to my invention a refractory tube 18 extends from one side to the other of the sheet of glass in a position closely adjacent to the rollers 16 and 12 and this refractory tube is supplied with nitrogen gas from a suitable source 19. This nitrogen gas may be delivered directly to the distributor 18 through pipe line 20 which is furnished with a valve 21, or it can be preheated by directing it from source 19 through pipe 22, which is also furnished with a valve 23, to heat exchanger 24 in which it may be raised to any desired temperature. A nozzle 25 extends throughout the full width of the glass sheet 11 and delivers the nitrogen gas to the space formed below the nozzle 25, above the bulb 26 of the glass and between the rollers 16 and 12. The nitrogen flows out between the rolls 16 and the glass sheet 11 and in doing so sweeps the screen 15 free of atmospheric air and replaces that air with a non-oxidizing atmosphere which prevents the oxidization of the screen. As the inert gas flows out it tends to ascend along the surface of the roller 16 and to reduce the quantity of atmospheric air in proximity to that roll to such an extent that no substantial degree of oxidation occurs even with the increase in temperature. A metal shield 27 may extend from each end of the distributor 18 to cover the ends of the space into which the inert gas is blown by nozzle 25, thus tending to restrict the quantity of atmospheric air which can become admixed with the nitrogen. In this form of the invention it is possible for a certain amount of atmospheric air to reach the screen, if only a low nitrogen flow is maintained, but it is so diluted by the inert gas that it is not harmful, and by opening the valve to the nitrogen supply wider all air can be excluded from the space between the rollers.

Figure 2:
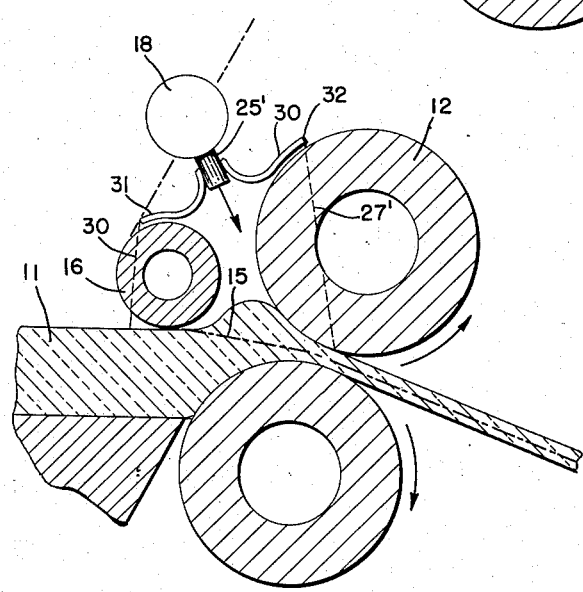
Fig. 2 is a similar view of a modified form of apparatus.

Under particular circumstances, when it is desired to most positively exclude all atmospheric air from the space between the rollers, a kind of hood such as that shown in Fig. 2 may be employed. In this case the nozzle 25' is supplied from distributor 18 and delivers the gas throughout the width of the glass beneath a hood 30 which has wings 31, 32 which extend into very close relation to the rollers 16 and 12, thus combining with the flow of non-oxidizing gas and effectively excluding air from the space into which the said gas flows. The ends of the hood extend downward at the ends of the rollers as indicated at 27' and close off the space at its ends. Thus, substantially the only inlet for gas is at 25' and the only substantial outlet is between the roller 16 and the glass 11. By this means, all of the atmospheric air is totally excluded from the screen 15 when it is in proximity to the surface of the glass. The hood 30 is composed of refractory material such as of a metal which has a softening point well above the temperature of the glass sheet 11.

In the types of apparatus of both Fig. 1 and Fig. 2, experience has shown that there is no evidence of oxidation of the armor in spite of the relatively high temperature at which it is raised by the adjacent hot glass and in spite of the even higher temperature to which it is sometimes raised by the employment of the heat exchanger 24.

At 33 there is shown a source of supply for a reducing gas such as hydrogen which may be supplied either to the heater 24 or without heating through line 20 directly to the distributor. Any other gas such as illuminating gas can be delivered by the source 33 and if desired, can be burned in the space between the three rollers 12, 16, 13, sufficient air being admitted, by increasing the distance between the distributor 18 and the rollers 12 and 16, to permit combustion. In any case in which a burning or a burned gas is employed, care will be taken to see that no soot is formed or delivered to the armor and that the atmosphere resulting from the burning is reducing in character.

*Example 1*

Using apparatus similar to that of Fig. 1, nitrogen gas at room temperature was supplied from a typical compression cylinder, and ordinary soda-lime glass was delivered by a furnace to the rolls at a temperature of about 1100° to 1160° C.; the rate of supply of nitrogen was merely sufficient to provide a mild current of nitrogen through the armor adjacent the glass. The armor was a mild steel wire screen having hexagons 1/2" across and was not noticeably retarded in temperature rise by the nitrogen flow as it neared the glass, as the nitrogen was heated about as readily between the rolls above the glass. By increasing the flow of nitrogen the temperature of the armor could be reduced, and by preheating the nitrogen in a gas fired preheater, the temperature of the armor could be adjusted to eliminate the danger of bubble formation and to facilitate its entry into the glass.

Armored glass made by the process and each such modification was compared with identical glass made on the same machine from the same batch without the protective envelope of inert gas, and was clearer, more uniform and more sparkling, and free of armor dullness such as is typical of prior art products.

In carrying out the invention, the protective gas may be preheated or it may be burned in contact with the armor, or both of these can be employed together, the gas being preheated and thereafter burned in contact with the armor. The armor itself can be subjected to special heating as long as it is within the protective envelope furnished by the inert or reductive gas. For instance, one may preheat the armor by passing it through a heated enclosure, using the heat of combustion of a protective gas to accomplish the heating and thereafter using the burned products of the protective gas for the purpose of protection by using it as an envelope around the wire as it is being introduced to the hot glass.

As a result of this invention, the nature of armored glass has been materially improved. The armored glass produced by this invention is clear, sparkling, not fogged in the neighborhood of the armor, and the armor itself is bright and lacks the patina of oxide which is so characteristic of armored glass of the prior art. The transparency and the appearance of the glass are improved because the coloration and obscuring of the glass in the neighborhood of the armor is eliminated. The formation of bubbles is reduced in the glass.

The invention involves the following taken singly or together: An improvement in the manufacture of armored glass which includes maintaining the armor in a non-oxidizing atmosphere before its introduction into the glass. Such protective atmospheres may be composed of inert gases, of inert gases mixed with reducing gases, or of reducing gases alone; the protective gas may be preheated or may be burned in contact with the armor just before the armor is enclosed in the glass. The preheating can be by the application of heat from external sources to the protective gas or it can be by the combustion of a combustible protective gas.

As many apparently widely different embodiments of the present invention may be made without departing from the spirit and scope thereof, it is to be understood that the invention is not limited to the specific embodiments.

What is claimed is:

1. The method of making armored glass that comprises delivering molten glass as a thicker sheet to forming rollers and delivering the glass from the rollers as a thinner sheet, introducing armor to the thicker sheet out of contact with forming rollers in a direction approximating the direction of the thinner sheet, and directing upon the thicker sheet and the armor adjacent the place of entry of the armor into the thicker sheet a flow of non-oxidizing gas including inert gas and burning gas, the major flow of gas at the point of contact of the glass and the armor being counter to the direction of movement of the armor and glass, thereby sweeping oxidizing gas out of the armor before its entry into the glass.

2. The method of making armored glass that comprises delivering molten glass as a thicker sheet to forming rollers and delivering the glass from the rollers as a thinner sheet, introducing armor to the thicker sheet out of contact with forming rollers in a direction approximating the direction of the thinner sheet, and directing upon the thicker sheet and the armor adjacent the place of entry of the armor into the thicker sheet a flow of non-oxidizing gas comprising burning gas, thereby sweeping oxidizing gas out of the armor before its entry into the glass.

3. The method of making armored glass that comprises delivering molten glass as a thicker sheet to forming rollers and delivering the glass from the rollers as a thinner sheet, introducing armor to the thicker sheet out of contact with the forming rollers in a direction approximating the direction of the thinner sheet, and directing upon the thicker sheet and the armor adjacent the place of entry of the armor into the thicker sheet a flow of hot, non-oxidizing gas, thereby sweeping oxidizing gas out of the armor before its entry into the glass.

4. The method of making armored glass that comprises delivering molten glass as a thicker sheet to forming rollers and delivering the glass from the rollers as a thinner sheet, introducing armor to the thicker sheet out of contact with the forming rollers in a direction approximating the direction of the thinner sheet, directing upon the thicker sheet and the armor adjacent the place of entry of the armor into the thicker sheet a flow of non-oxidizing gas, flowing the said gas on a course through the armor contiguous to the place of entry of the armor to the glass, thereby sweeping oxidizing gas out of the armor before its entry into the glass.

5. The method of making armored glass that comprises forming a sheet from a molten mass of glass, putting armor into the glass at a place out of contact with forming machinery, directing upon the glass and the armor at the place of entry of the armor into the glass a flow of non-oxidizing gas, the flow of gas at the point of contact of armor and glass being counter to the direction of motion of the armor and glass, thereby sweeping oxidizing gas out of the armor before its entry into the glass and minimizing the entrapment of gas in the glass.

6. The method of making armored glass that comprises delivering molten glass as a thicker sheet to forming rollers and delivering the glass from the rollers as a thinner sheet, introducing armor to the thicker sheet out of contact with forming rollers and in a direction approximating the direction of the thinner sheet, directing upon the thicker sheet and the armor adjacent the place of entry of the armor into the thicker sheet a flow of non-oxidizing gas, thereby sweeping oxidizing gas out of the armor before its entry into the glass.

7. The method of making armored glass that comprises delivering a mass of molten glass to sheet-forming machinery, enclosing armor in the glass before the glass reaches the sheet-forming machinery, maintaining through the armor at the place where it enters the glass mass a flow of non-oxidizing gas so directed as to sweep oxidizing gases out of the armor, and maintaining the armor in the flow of non-oxidizing gas until it has become submerged in and covered by the glass.

8. A method of making armored glass that comprises enclosing the armor in a non-oxidizing atmosphere, heating the armor while enclosed in said non-oxidizing atmosphere to a temperature higher than that which it naturally attains by reason of its proximity to the glass, and maintaining the armor in said non-oxidizing atmosphere until it is embedded in the glass.

References Cited in the file of this patent

UNITED STATES PATENTS

| Number | Name | Date |
|---|---|---|
| 831,640 | Walsh | Sept. 25, 1906 |
| 912,950 | Gibert | Feb. 16, 1909 |
| 1,809,863 | Paxton | June 16, 1931 |
| 1,824,365 | Pond et al. | Sept. 22, 1931 |
| 1,837,455 | Lewis | Dec. 22, 1931 |
| 1,905,006 | Shuman | Apr. 25, 1933 |
| 1,938,540 | McCreary | Dec. 5, 1933 |